3,155,625
COLOR STABILIZATION OF MIXTURES OF TRICHLOROFLUOROMETHANE AND N,N,N',N' - TETRAKIS(HYDROXYALKYL)ALKYL-ENEDIAMINES

Laurence John Long, Palo Alto, Calif., and Samuel R. Williams, Greensboro, N.C., assignors to E. I. du Pont de Nemours and Company, Wilmington, Del., a corporation of Delaware
No Drawing. Filed Dec. 22, 1960, Ser. No. 77,490
2 Claims. (Cl. 252—182)

This invention relates to the stabilization of mixtures of trichlorofluoromethane and N,N,N',N'-tetrakis-(hydroxyalkyl) alkylenediamines.

More particularly this invention relates to the color stabilization of these mixtures which undergo a color change from water white to amber upon standing for a short period of time.

The preparation of rigid polyurethane foams is greatly enhanced by the addition of tetrakis(hydroxyalkyl)alkylenediamines of the structure $$(HO-R')_2N-R-N(R'-OH)_2$$

wherein R and R' are alkylene groups containing from two to six carbon atoms and particularly those of the structure

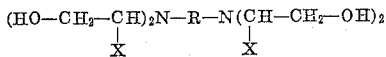

wherein X is hydrogen or an alkyl group of one to four carbon atoms. The tetrakis(hydroxyalkyl)alkylenediamines are used as catalysts and crosslinking agents in the production of foams. Due to their quite viscous nature, the tetrakis(hydroxyalkyl)alkylenediamines are difficult to handle, particularly to mix rapidly with other materials. The high viscosity is overcome by mixing the tetrakis(hydroxyalkyl)alkylenediamine with trichlorofluoromethane. The resulting solution acts simultaneously as a catalyst, crosslinking agent and blowing agent when used with a proper mixture of polyol, isocyanate and surface active agent since the trichlorofluoromethane is easily vaporized. There is one major disadvantage to this process. Solutions of trichlorofluoromethane and tetrakis(hydroxyalkyl)alkylenediamines undergo a color change from water white to amber upon standing for a short time. This color is in turn transmitted to the polyurethane foams.

This invention has as an object the stabilization of mixtures of trichlorofluoromethane and N,N,N',N'-tetrakis-(hydroxyalkyl)alkylenediamines. A further object is the color stabilization of these mixtures for a period of time which has previously rendered the mixtures useless due to extreme color changes. Other objects will appear hereinafter.

These and other objects are accomplished by using 4,4'-thiobis(3-methyl-6-tert.-butylphenol) as the stabilizing agent in a mixture of trichlorofluoromethane and N,N,N',N'-tetrakis(hydroxyalkyl)alkylenediamine.

The stabilizing composition is prepared from about 10% to 50% by weight trichlorofluoromethane, from about 0.25% to 0.5% by weight 4,4'-thiobis(3-methyl-6-tert.-butylphenol) and from about 50% to 90% by weight (the remainder to make 100%) of $$(HOR')_2NRN(R'OH)_2$$

wherein R and R' are alkylene groups containing from two to six carbons.

The N,N,N',N'-tetrakis(hydroxyalkyl)alkylenediamines which may be used in this invention have the structure

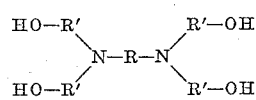

wherein R and R' are alkylene radicals containing from 2 to 6 carbon atoms. The nitrogen atoms and hydroxyl groups are attached to separate carbon atoms of the R' groups, and the two nitrogen atoms are attached to separate carbon atoms of the R group. The location of the hydroxyl group on R' is not critical with the exception that it must not be attached to a carbon atom that is attached to the nitrogen atoms. Examples of the diamines which fall within the scope of this structure are: N,N,N',N' - tetrakis(2 - hydroxypropyl)ethylenediamine, N,N,N',N' - tetrakis(2-hydroxyethyl)ethylenediamine, N-(2-hydroxyethyl)-N,N',N'-tris(2-hydroxypropyl)ethylenediamine, N,N,N',N'-tetrakis(2-hydroxypropyl)tetramethylenediamine, N - (4 - hydroxybutyl) - N,N',N' - tris(2-hydroxypropyl)hexamethylenediamine, N,N,N',N'-tetrakis(6-hydroxyhexyl)tetramethylenediamine, N,N,N',N'-tetrakis(4-hydroxybutyl)trimethylenediamine, N,N,N',N'-(2-hydroxybutyl)hexamethylenediamine and the like.

The following examples will better illustrate the nature of the present invention; however the invention is not intended to be limited to these examples. Parts are by weight unless otherwise indicated.

EXAMPLE I

A solution was prepared containing 70% by weight N,N,N',N'-tetrakis(2-hydroxypropyl)ethylenediamine and 30% by weight trichlorofluoromethane. A 0.5% (on weight of solution) sample of 4,4'-thiobis(3-methyl-6-tert.-butylphenol) was added to the solution. The solution was then stored in a sealed container at 100° F. and the color change of the solution was periodically observed. The solution has a very weak pale yellow color upon addition of the stabilizer and maintained this color for thirteen days. During the thirteenth to twentieth day of observation, the color slightly changed to a very pale yellow appearance. Thereafter no further changes were noticed and observations were discontinued at the end of the sixty-sixth day. A comparison of the stabilization effect of 4,4'-thiobis(3-methyl-6-tert.-butylphenol) with other known inhibitors is given in Table I.

Table I

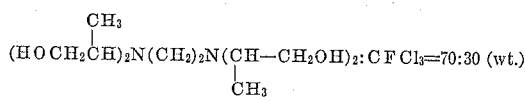
$(HOCH_2CH)_2N(CH_2)_2N(CH{-}CH_2OH)_2 : CFCl_3 = 70:30$ (wt.) with CH_3 groups

| Inhibitor (0.5% wt.) | Color After Indicated Days at 100° F. | | | | | | |
|---|---|---|---|---|---|---|---|
| | 0 | 2 | 4 | 8 | 13 | 20 | 66 |
| 1. 50% terpolymer (containing 40% styrene, 50% oleyl methacrylate and 10% diethylaminoethyl methacrylate) 50% kerosene | WW | Dk. Y | + | A | — | — | — |
| 2. Isoprene | PG | + | + | + | — | — | — |
| 3. Ethoxylated abietylamine | WW | PY | + | A | — | — | — |
| 4. Vinyl acetate | WW | Dk. Y | + | Y | + | — | — |
| 5. p-n-Butylaminophenol | VPY | PY | + | Y | + | — | — |
| 6. N,N'-di-sec.-butyl-p-phenylenediamine | Lt. pink | + | + | Dk. pink | A | — | — |
| 7. 2,6-di-tert.butyl-4-methylphenol | WW | + | + | Dk. Y | A | — | — |
| 8. 4,4'-thiobis(3-methyl-6-tert.butylphenol) | VVPY | + | + | + | + | VPY | + |

+ = Same as previous observation.  WW = Water white.  Lt. = Light.  A = Amber.
— = Test abandoned.  V = Very.  Y = Yellow.  G = Green.

EXAMPLE II

Solutions containing N,N,N',N'-tetrakis-(2-hydroxypropyl)ethylenediamine and trichlorofluoromethane in the concentrations indicated in Table II were prepared. Then 4,4'-thiobis(3-methyl-6-tert.-butylphenol), at the concentrations indicated in Table II, was dissolved in these solutions. Table II indicated the color of these solutions after storing in sealed containers at 100° F.

Table II

| $(HOCH_2CH)_2N(CH_2)_2/CFCl_3$ (with CH_3) (Wt./Wt.) | $S{-}(C_6H_2(C(CH_3)_3)(CH_3){-}OH)_2$ Percent Wt. | Color After Indicated Days at 100° F. | | | | | | |
|---|---|---|---|---|---|---|---|---|
| | | 0 | 2 | 15 | 28 | 38 | 45 | 32 |
| 50/50 | 0.5 | VVPY | + | + | + | + | + | + |
| 70/30 | 0.4 | WW | VVPY | + | + | + | + | + |
| 70/30 | 0.3 | WW | VVPY | + | + | VPY | PY | + |
| 70/30 | 0.2 | WW | VVPY | PY | A | — | — | — |

+ = Same as previous observation.  WW = Water white.  P = Pale.  A = Amber.  Dk. = Dark.
— = Test abandoned.  V = Very.  Y = Yellow.  Lt. = Light.  G = Green.

It is apparent from these examples that 4,4'-thiobis(3-methyl-6-tert.-butylphenol), in the concentration range of about 0.25% to 0.5%, inhibits the formation of color in the tetrahydroxydiamine solutions whereas several other types of well known inhibitors eventually fail. Color, as previously noted, is undesirable in the solution since it is carried over into the foams in which the solutions are used. The presence of the inhibitor has no effect whatsoever on the properties of the foamed products in which it is incorporated.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition consisting essentially of a mixture of about 50% to 90% by weight of N,N,N',N'-tetrakis-(hydroxyalkyl)alkylenediamine and about 50% to 10% by weight of trichlorofluoromethane and containing 0.25% to 0.5% by weight of 4,4'thiobis(3-methyl-6-tert.-butylphenol) as a color stabilizer, said N,N,N',N'-tetrakis-(hydroxyalkyl)alkylenediamine having the formula $(HOR')_2N{-}R{-}N(R'OH)_2$ wherein R and R' are alkylene groups of two to six carbon atoms with the nitrogen atoms and hydroxyl groups being attached to separate carbon atoms of the R' groups and the two nitrogen atoms being attached to separate carbon atoms of the R group.

2. A composition consisting essentially of a mixture of 50% to 90% by weight of N,N,N',N'-tetrakis(2-hydroxypropyl)ethylenediamine and 50% to 10% by weight of trichlorofluoromethane and containing 0.25% to 0.5% by weight of 4,4'thiobis(3-methyl-6-tert.-butylphenol) as a color stabilizer.

References Cited in the file of this patent

UNITED STATES PATENTS

| | | |
|---|---|---|
| 2,868,745 | Canarias | Jan. 13, 1959 |
| 2,915,496 | Swart et al. | Dec. 1, 1959 |
| 2,962,183 | Rill et al. | Nov. 29, 1960 |
| 3,029,257 | Campbell | Apr. 10, 1962 |